US010267596B2

(12) United States Patent
Weekly

(10) Patent No.: US 10,267,596 B2
(45) Date of Patent: Apr. 23, 2019

(54) SAFETY SYSTEM INCLUDING A WEAPON HOLSTER AND BODY-WORN CAMERA SYSTEM

(71) Applicant: Roy L. Weekly, Naples, FL (US)

(72) Inventor: Roy L. Weekly, Naples, FL (US)

(*) Notice: Subject to any disclaimer, the term of this patent is extended or adjusted under 35 U.S.C. 154(b) by 291 days.

(21) Appl. No.: 14/865,993

(22) Filed: Sep. 25, 2015

(65) Prior Publication Data

US 2017/0054951 A1    Feb. 23, 2017

Related U.S. Application Data

(60) Provisional application No. 62/208,495, filed on Aug. 21, 2015.

(51) Int. Cl.
*F41J 9/18* (2006.01)
*H04N 5/77* (2006.01)
*H04N 7/18* (2006.01)
*F41C 33/02* (2006.01)

(52) U.S. Cl.
CPC .............. *F41C 33/029* (2013.01); *F41J 9/18* (2013.01); *H04N 5/772* (2013.01); *H04N 7/185* (2013.01)

(58) Field of Classification Search
CPC .......... H04N 7/181; H04N 7/185; H04N 7/18; H04N 7/183; H04N 5/2252; H04N 5/77; H04N 5/772; H04N 5/232; F41A 17/063; F41A 17/066; F41A 17/06; G08B 25/016; G08B 13/19695; F41C 33/0263; F41C 33/0209; H04W 4/22
See application file for complete search history.

(56) References Cited

U.S. PATENT DOCUMENTS

| 5,546,124 A | 8/1996 | Scerbo, III |
| 2014/0362257 A1* | 12/2014 | Viljamaa ............... H04N 5/2251 348/231.99 |
| 2016/0241807 A1* | 8/2016 | Kovac ....................... H04N 5/77 |

* cited by examiner

Primary Examiner — Farhan Mahmud
(74) Attorney, Agent, or Firm — McGinn I.P. Law Group, PLLC.

(57) ABSTRACT

A safety system, including a weapon holster including a transmitter and an external trigger mechanism configured to cause the transmitter to transmit a signal, a camera including a receiver configured to receive the signal from the transmitter and a body camera system including a processor, and a memory, the memory storing instructions to cause the processor to execute when the receiver receives the signal: a flagging module configured to create a starting flag and an ending flag in a video segment recorded by the camera.

16 Claims, 8 Drawing Sheets

SAFETY SYSTEM INCLUDING A WEAPON HOLSTER AND BODY-WORN CAMERA SYSTEM

This Application claims priority from U.S. Provisional Application No. 62/208,495, entitled "BODY-WORN CAMERA SYSTEM INCLUDING A WEAPON HOLSTER HAVING A TRANSMITTER", which was filed on Aug. 21, 2015, the entire contents of which are incorporated herein by reference.

BACKGROUND OF THE INVENTION

The present invention relates to a safety system including a body-worn camera system and a weapon holster having a transmitter and, more particularly, to flagging a video taken by a body-worn camera ("body cam(s)") based on activation of the transmitter disposed on the weapon holster.

The recent emergence of body-worn cameras has already had an impact on policing, and this impact will only increase as more agencies adopt this technology. The decision to implement body-worn cameras is being done nation-wide.

Body-worn cameras, which an increasing number of law enforcement agencies are adopting, represent one new form of technology that is significantly affecting the field of policing. Law enforcement agencies are using body-worn cameras in various ways: to improve evidence collection, to strengthen officer performance and accountability, to enhance agency transparency, to document encounters between police and the public, and to investigate and resolve complaints and officer-involved incidents.

Due to the increase in body-worn cameras, there has also been an increase in the amount, need and time to analyze the video for content of incidents. This task is currently extremely costly and taxing on individuals.

Conventionally, body cams constantly record video and it is difficult to find the exact time and date of the video when an incident occurs. Also, the user (i.e., police officer) has had no way to flag the video to indicate that an incident is occurring even if the gun is not un-holstered.

Moreover, the time it takes when there is an incident of police shooting, to review hours of camera time to review is very taxing (monotonous, etc.) and takes great amount of time and expense. Also, there is not an instant notification when the gun is un-holstered.

Therefore, it is desirable to provide an improved way to detect when an incident has occurred, thereby to reduce the money and time spent on analyzing body camera videos.

SUMMARY OF THE INVENTION

In view of the foregoing and other problems, disadvantages, and drawbacks of the aforementioned background art, an exemplary aspect of the disclosed invention provides a body camera system, method, and non-transitory recording medium to flag a video when an event has occurred to, for example, reduce the amount of time it takes to review video and expense associated therewith.

In an exemplary embodiment, the present invention can provide a safety system, including a weapon holster including a transmitter and an external trigger mechanism configured to cause the transmitter to transmit a signal, a camera including a receiver configured to receive the signal from the transmitter and a body camera system including a processor, and a memory, the memory storing instructions to cause the processor to execute when the receiver receives the signal: a flagging module configured to create a starting flag and an ending flag in a video segment recorded by the camera.

Further, in another exemplary embodiment, the present invention can provide a safety method for flagging a video segment recorded by a camera, including transmitting a first signal when an external mechanism is activated, create a starting flag of the video segment when the signal is received, transmitting a second signal when the external mechanism is activated a second time, and create an end flag of the video segment when the second signal is received.

Even further, in another exemplary embodiment, the present invention can provide a non-transitory computer-readable recording medium recording a safety program for flagging a video segment recorded by a camera, the program causing a computer to perform, transmitting a first signal when an external mechanism is activated, flagging a starting flag of the video segment when the signal is received, transmitting a second signal when the external mechanism is activated a second time, and flagging an end flag of the video segment when the second signal is received.

Accordingly, it is an exemplary advantage of the invention to provide a threat-resistant shield that includes a sensor configured to transmit a distress signal, which can be portable so that it can be taken by students in the event that the school issues an evacuation order (bomb threat or fire alarm) that puts all students in a milling group outside the secure perimeter of school walls and locking features. The threat-resistant shield can be configured to be attached to any portion of a chair, desk, bench, wall, or any location which is easily accessible during an emergency incident.

There has thus been outlined, rather broadly, an embodiment of the invention in order that the detailed description thereof herein may be better understood, and in order that the present contribution to the art may be better appreciated. There are, of course, additional exemplary embodiments of the invention that will be described below and which will form the subject matter of the claims appended hereto.

It is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods, and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

The exemplary aspects of the invention will be better understood from the following detailed description of the exemplary embodiments of the invention with reference to the drawings.

DETAILED DESCRIPTION OF THE EXEMPLARY EMBODIMENTS

Figure 1:
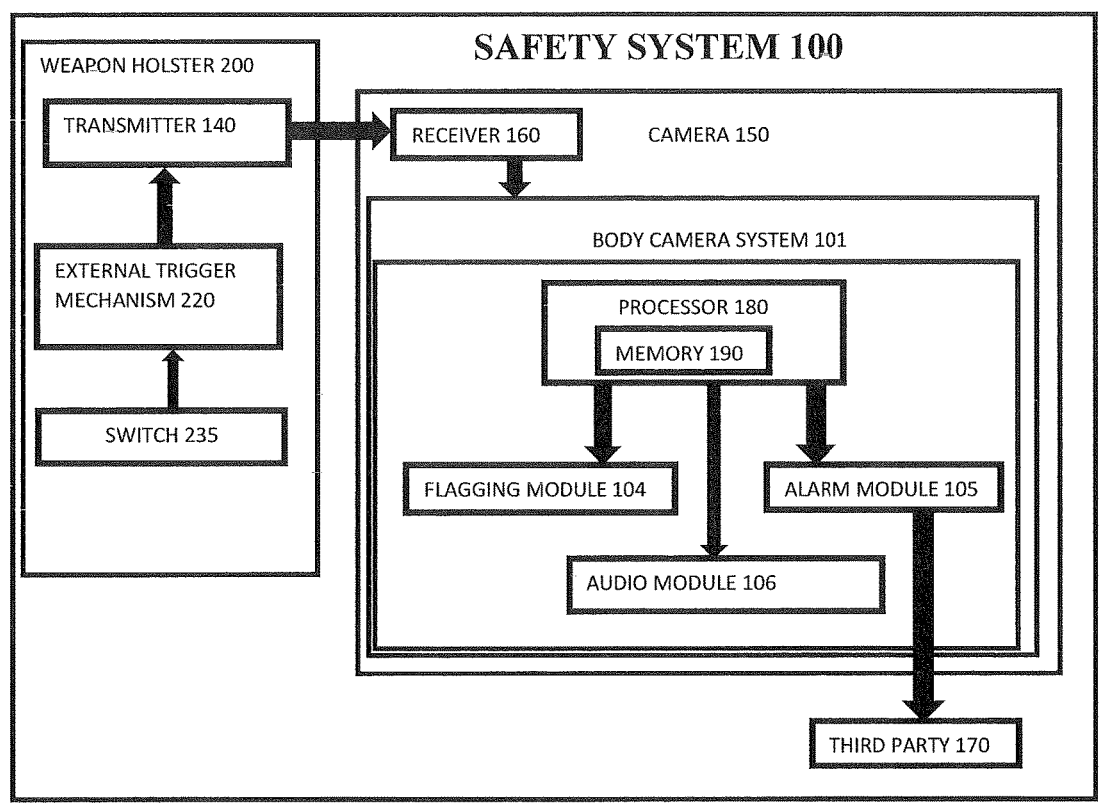
FIG. 1 exemplarily shows a block diagram illustrating a configuration of a safety system 100.

The invention will now be described with reference to the drawing Figures, in which like reference numerals refer to like parts throughout. It is emphasized that, according to common practice, the various features of the drawing are not necessarily drawn to scale. On the contrary, the dimensions of the various features can be arbitrarily expanded or reduced for clarity. Exemplary embodiments are provided below for illustration purposes and do not limit the claims.

With reference now to FIG. 1, the safety system 100 includes a weapon holster and a camera 150.

The camera 150 includes a receiver 160 and a body camera system 101 comprising a flagging module 104, an alarm module 105, and an audio module 106. The body camera system 101 includes a processor 180 and a memory 190, the memory 190 storing instructions to cause the processor 180 to execute each module of the body camera system 101.

The weapon holster 200 comprises a transmitter 140, an external trigger mechanism 220, and a switch 235 and is attached to a belt 270.

The receiver 160 receives a signal from the transmitter 140. The transmitter 140 and receiver 160 are both powered by power regulation and filtering mechanisms connected to the respective modules.

The transmitter 140 further includes radio frequency (RF) generating mechanisms and an antenna system. The external trigger mechanism 220 is also connected to the transmitter 140 to activate the body camera system 101. The receiver 160 has a network of RF receiving mechanisms, which acts as a trigger to the body camera system 101 once the signal is received from the transmitter 140.

Referring to FIGS. 2 to 6, an external trigger mechanism 220 is connected to the transmitter 140. Triggering the external trigger mechanism 220 will activate the RF generating mechanisms of the transmitter 140, and send data for modulation and transmission to the receiver 160. It should be noted that the RF generating mechanisms includes any conventional method of generating a radio frequency signal such that the receiver 160 is capable of receiving the same.

Figure 2:
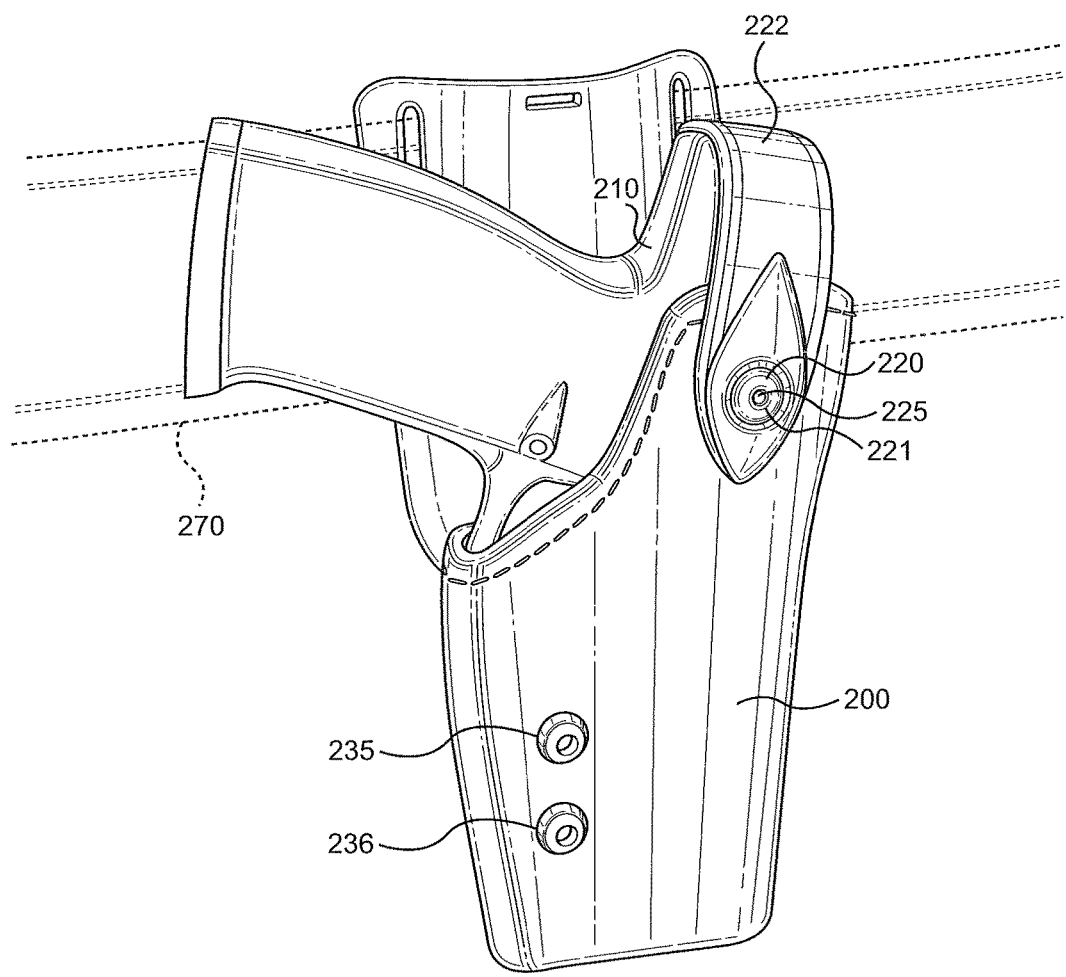
FIG. 2 exemplarily shows a side perspective view weapon holster with a gun secured therein.
Figure 3:
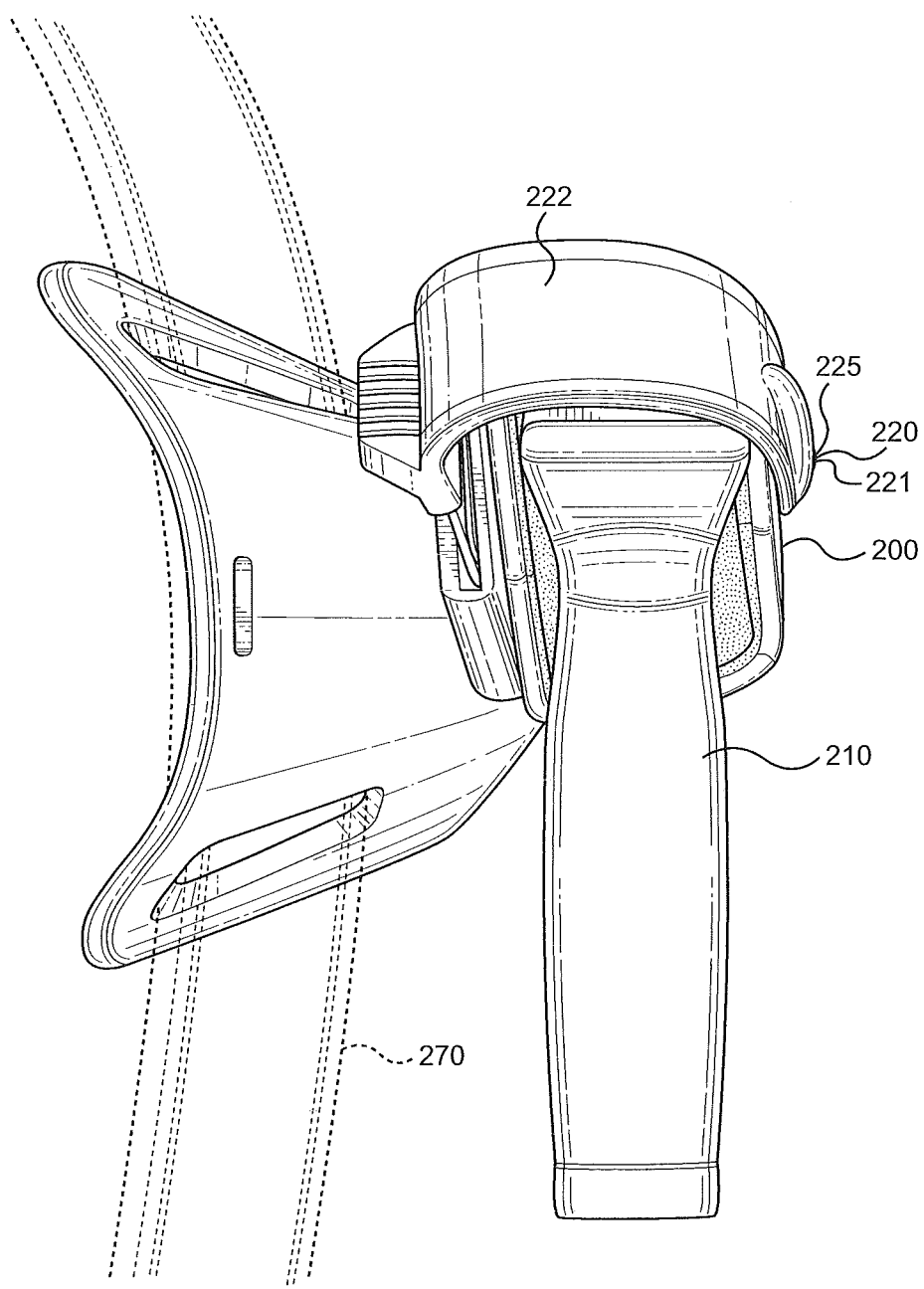
FIG. 3 exemplarily shows a top view weapon holster with the gun secured therein.
Figure 4:
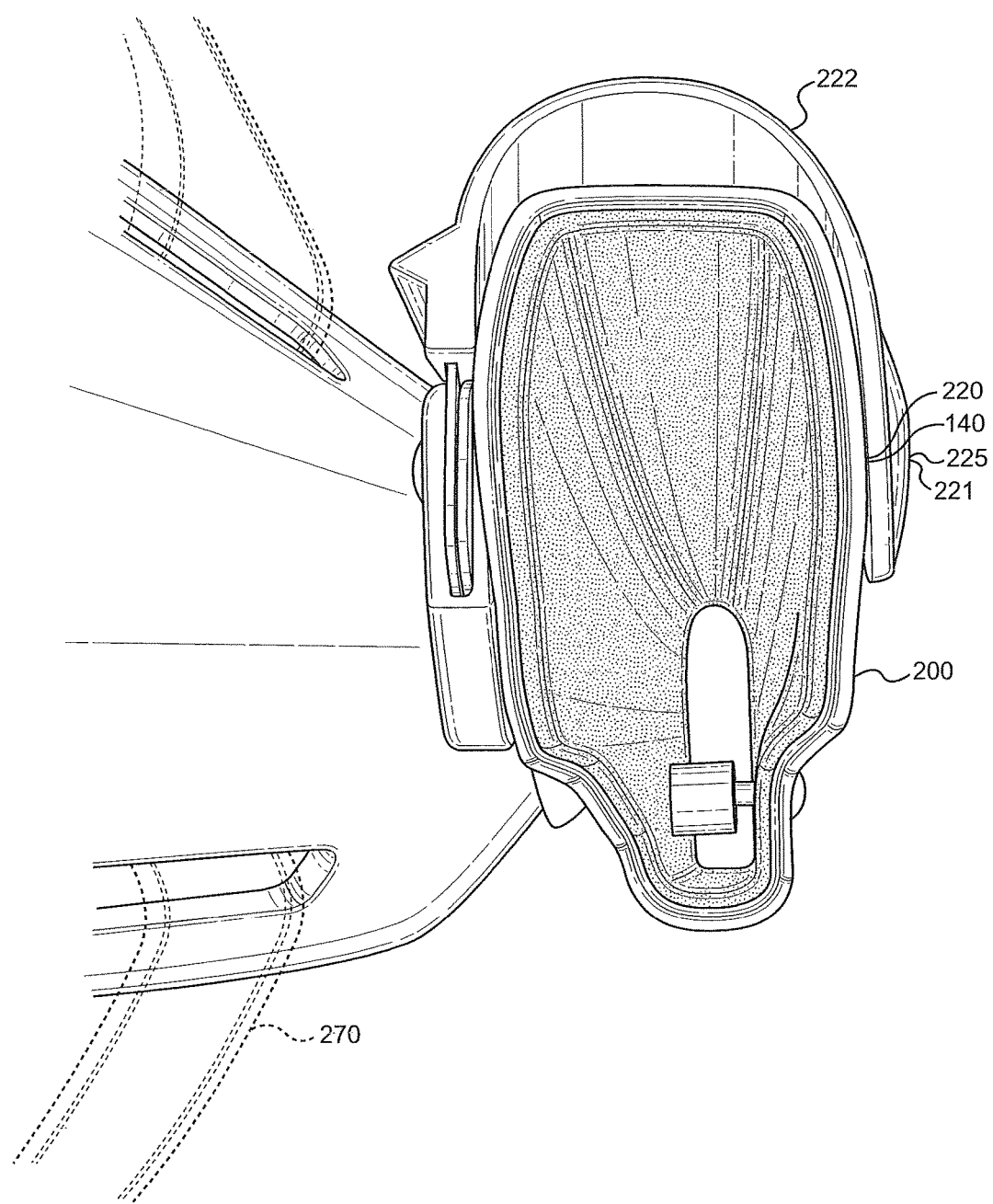
FIG. 4 exemplarily shows a top view weapon holster with-out the gun secured therein and the securing mechanism in an un-secured state.
Figure 5:
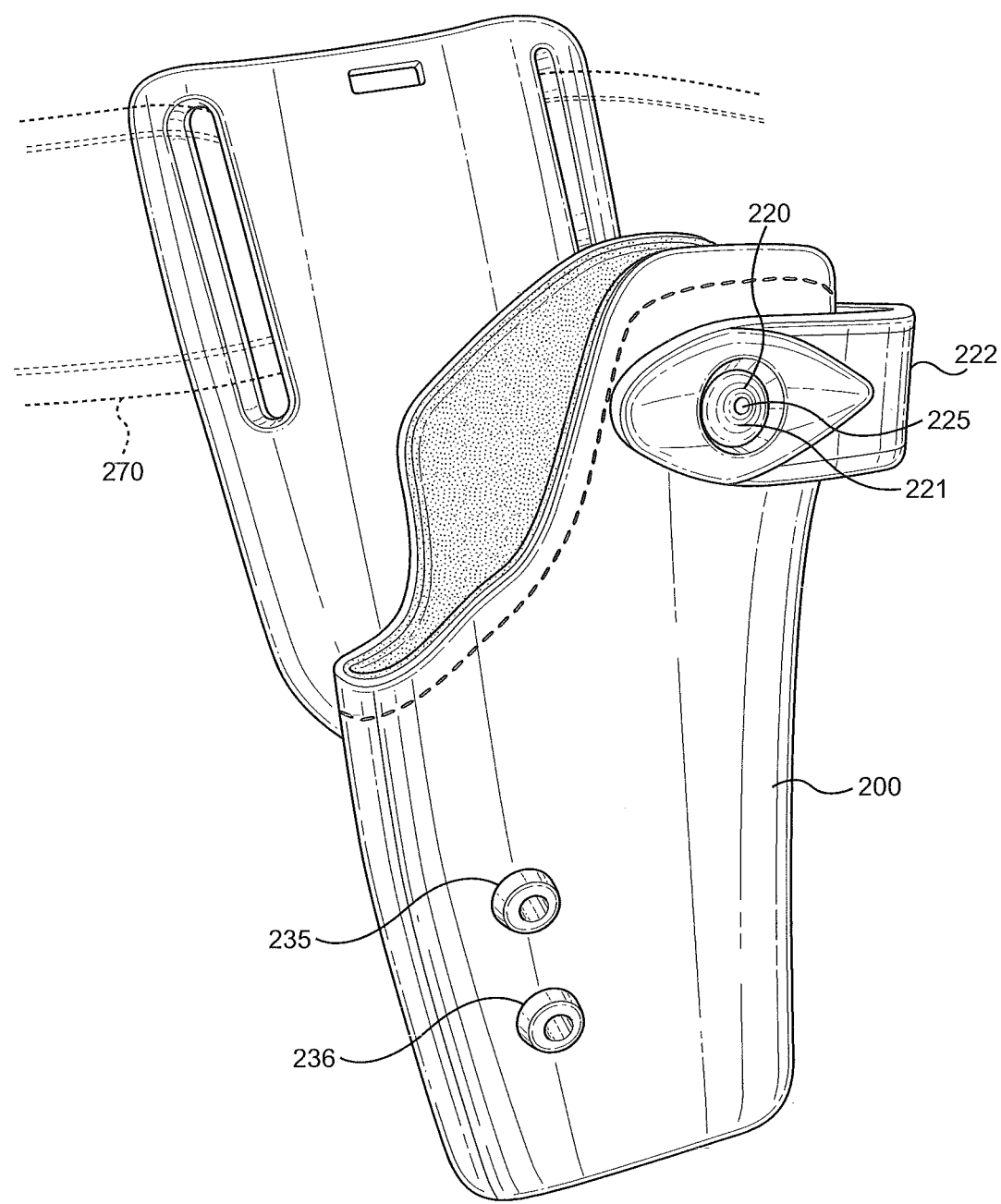
FIG. 5 exemplarily shows a side perspective view weapon holster without the gun secured therein and the securing mechanism in an un-secured state.
Figure 6:
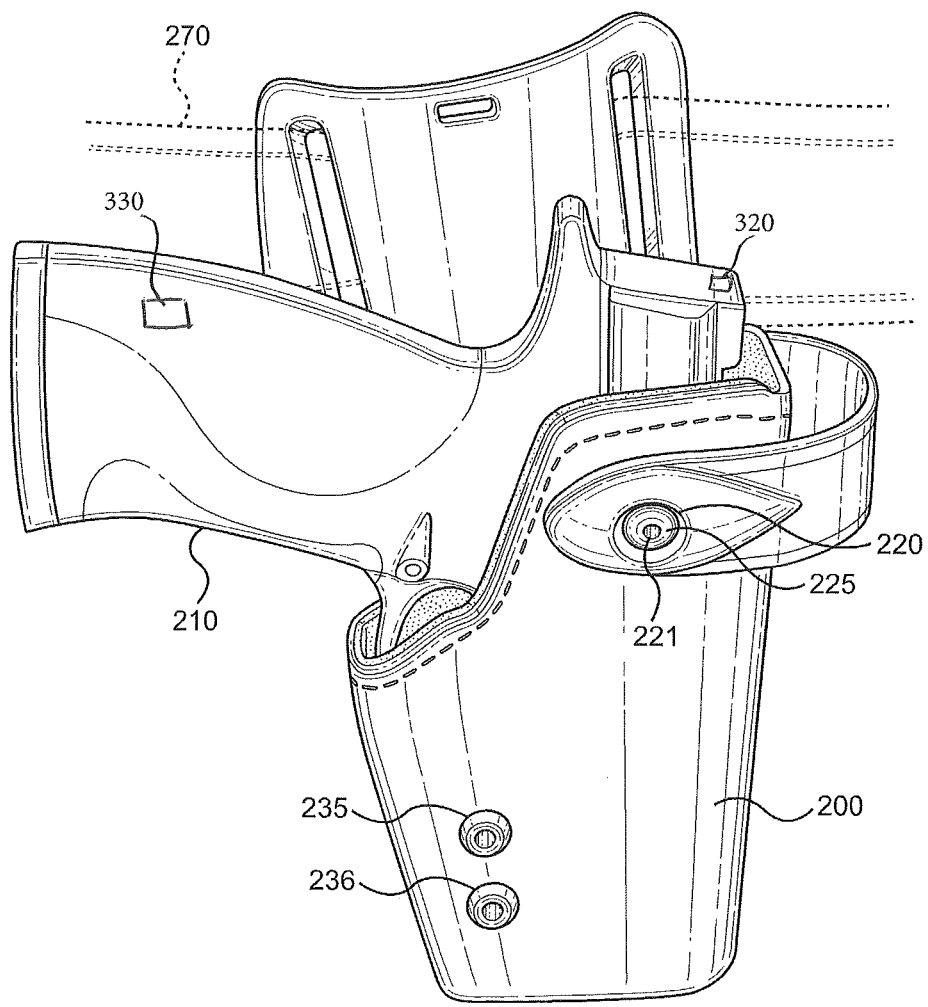
FIG. 6 exemplarily shows a side view weapon holster with the gun secured therein but the securing mechanism in an un-secured state.

In the first exemplary embodiment, a hinge 221 of a securing strap 222 of a holster 200 includes the external trigger mechanism 220. The external trigger mechanism 220 is activated when the securing strap 222 is moved from a secured state as shown in FIG. 2 to an un-secured state as shown in FIG. 6 in which the weapon 210 can be removed from the holster 200. A secured state includes a state in which the weapon 210 is secured in the holster 200 and an un-secured state is a state in which the weapon 210 is not secured in the holster 200 such that the user can remove the weapon 210 from the holster 200. That is, a rotation of the hinge 221 can trigger the external trigger mechanism 220.

Other methods to remove the weapon 210 from the holster 200 can activate the external trigger mechanism 220.

Further, the removal of the belt 270 holding the holster 200 from the officer's body could also activate the trigger mechanism 220.

For example, the hinge 221 can be a fastener 225 in which the fastener 225 (such as a button connection or clip mechanism) is un-fastened such that the weapon 210 can be removed by the strap 222 being in the un-secured state. Another non-limiting example can include a sensor being disposed on the weapon 210 and inside the holster 200 to detect that the weapon 210 is removed from the holster, and the external trigger mechanism 220 is triggered. In such a manner, the external trigger mechanism 220 is automatically activated when the weapon 210 is un-secured or removed from the holster 200. It should be noted that present invention is intended to include any mechanism to hold the weapon 210 in the weapon holster 200 in a secured state and an un-secured state.

Moreover, the rotation of the hinge 221 causes the external trigger mechanism 220 to activate no matter which direction the hinge 221 is rotated. That is, if the weapon 210 is re-holstered and the hinge 221 is rotated back such that the strap 222 of the holster 200 is in the secured state, the external trigger mechanism 220 will activate and cause the transmitter 140 to send a signal to the receiver 160.

The direction of the rotation of the hinge 221 will trigger the external trigger mechanism 220 to cause the transmitter 140 to send a different signal to indicate a different event.

Once the external trigger mechanism 220 is activated, the external trigger mechanism 220 triggers the transmitter 140 to turn on and activate the RF generating mechanisms, and send data for modulation and transmission to the receiver 160.

Once the receiver 160 receives the RF signal from the transmitter 140, the camera starts recording a video. It should be noted that the camera can already be recording a video and the receiver does not need to turn on the camera. It is merely a built in function that the receiver 160 will cause the camera to start recording once it receives a signal from the transmitter 140.

Further, when the receiver 160 receives the RF signal from the transmitter, the processor 180 of the body camera system 101 receives the signal from the receiver 160 and the instructions stored in the memory 190 causes the processor 180 to execute each module of the body camera system 101.

Referring back to FIG. 1, when the receiver 160 receives a signal from the transmitter 140, the flagging module 104 places (i.e., creates) a flag on the video when the external trigger mechanism 220 is activated. The flag can include a time stamp or a partition such that the video is marked that an event is beginning or ending at the time when the external trigger mechanism 220 is activated.

That is, when the hinge 221 is rotated such that the weapon 210 is un-holstered, the flagging module 104 will flag the video that the incident has begun. When the hinge 221 is rotated such that the weapon 210 re-holstered, the flagging module 104 will flag the video again indicating that an event has ended. In this manner, the direction of the rotation of the hinge 221 triggers the external trigger mechanism 220 to cause the transmitter 140 to send the different signal to indicate the different event (i.e., start or end of incident).

The flag on the video can further include a marking including a starting flag 801 and an ending flag 802 (or some other indicia including, for example, and audio tone for a start and a different tone for an end) that allows the viewer of the video to select the video segments of the video in which are flagged. The starting flag 801 and the ending flag 802 can partition the video so as to create a separate scene which the viewer can easily select.

Figure 8:
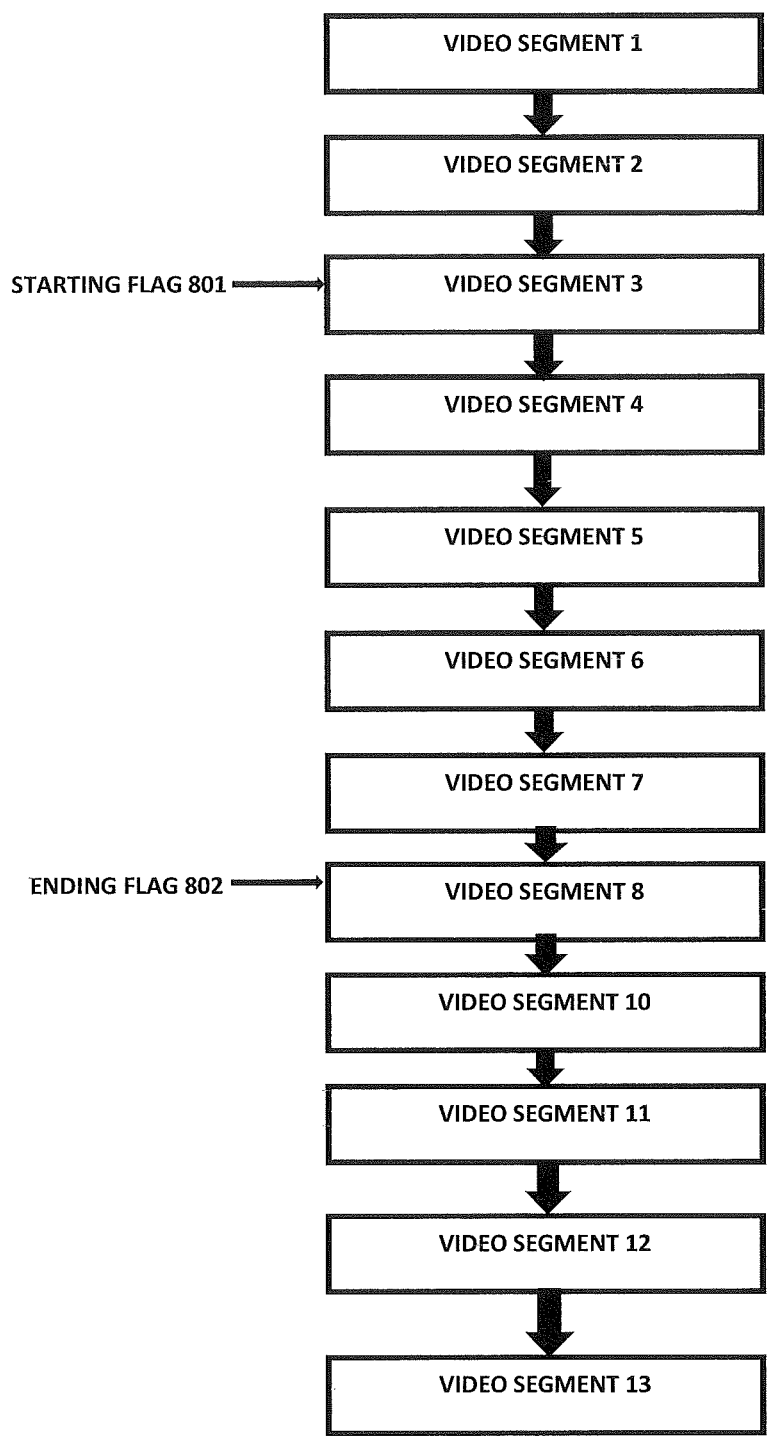
FIG. 8 exemplarily shows a block diagram illustrating the flagging module 104 flagging a video at a start time 801 and an end time 802.

Referring to FIG. 8, in an exemplary and non-limiting embodiment, the camera has recorded a video including 13 video segments. When the hinge 221 is rotated such that the weapon 210 is un-holstered, the flagging module 104 creates a starting flag 801 at video segment 3. The incident continues and then when the hinge 221 is rotated such that the weapon 210 re-holstered, the flagging module 104 will create an ending flag 802 on video segment 8 indicating that an event has ended. As can be seen, the camera 150 can be continuously recording a video from video segment 1 to video segment 13. However, by indicated the starting flag 801 and the ending flag 802, the viewer can easily and efficiently review the video from the start of the incident to the end of the incident without having to view the excess video segments (i.e., video segments 1, 2, 10, 11, 12, and 13). In this manner, the video recorded by the camera 150 is segmented by the flagging module 104 for easy review.

When the receiver receives a signal from the transmitter 140, the audio module 106 on the camera is activated such that audio will also be recorded along with the video.

When the receiver 160 receives a signal from the transmitter 140, the alarm module 105 outputs a signal to a third party 170 that the user has drawn the weapon 210. The alarm signal can include a location of the officer using a Global Position System (GPS) tracking system. In other words, the body camera system includes mechanisms for detecting a GPS of the user. The third party 170 may include all officer units within a certain distance, a police station, emergency call center, etc.

Since the alarm module 105 automatically sends a signal when the weapon 210 is un-holstered, the officer does not need to radio that shots are being fired or that a situation is escalated, but the un-holstering of the weapon 210 alerts the police station that a police officer is in an incident, potential danger, threatening, or situation requiring force.

Referring back to FIGS. 1 and 2, the external trigger mechanism 220 can be further connected to the switch 235 which the user can activate by pressing the same and thus manually starting the flagging of the video (It is assumed that the video is continuously imaging; if another configuration is provides (i.e., the video is only selectively operated), the switch 235 can be used to begin the imaging). Once the user presses the switch 235, the external trigger mechanism 220 is triggered and the transmitter 140 sends the signal to the receiver 160 which then the flagging module 104 will flag the video, the audio module 106 will start recording, and the alarm module 105 will send a signal to a third party 170.

Therefore, the switch 235 can act as a hidden emergency signal indicator. For example, if the user is unable to un-holster his weapon 210 due to a threat but can press the switch 235, the alarm module 105 can send the signal that includes the location of the user and back up police/authorities can arrive. The threat will not be aware that back-up has been called for since the user did not have to use a radio as is conventionally done.

Also, since the body camera will be active, the third party 170 viewing the live video can inform the reinforcements of the current situation and better protect the additional people.

In another exemplary embodiment, the switch 235 and the hinge 221 can be configured to activate the external trigger mechanism 220 to trigger the transmitter 140 to send a second signal to the receiver.

For example, the switch 235 can be used to indicate that a "moderate event" is occurring (e.g., an initial questioning of a suspect). However, once the hinge 221 is moved such that the weapon 210 is un-holstered and the external trigger mechanism 220 is activated, an emergency signal indicating an "extreme" event is occurring can be sent by the alarm module 104 (e.g., the suspect has become disgruntled or draws a weapon). Thus, gradations of events can be indicated.

Also, the holster 200 can include a plurality of switches 235 and 236, each having a different type of signal to be sent by the alarm module 104 to the third party 170 (e.g., a switch 235 to call for backup and a switch 236 to indicate a moderate event).

In another exemplary embodiment, the receiver 160, the hinge 221, fastener 225, and switch 235 can be connected by an electrical wire to send the signal to activate the body camera system 101. Therefore, the RF mechanisms is not needed and a more secure connection can be maintained between the transmitter 140 and the receiver 160.

In another exemplary embodiment, the weapon 210 includes a sensor 330 on the handle that measures grip pressure. The sensor 330 on the handle is connected to the external trigger mechanism 220 to trigger the transmitter 140 to transmit a signal when a certain grip pressure is applied to the handle of the weapon 210. The grip pressure, for example, may indicate an event of interest such as the Officer is engaged in a shootout, the Officer is engaged in a violent situation, etc.

In another exemplary embodiment, the weapon 210 includes a sensor 320 on the hammer mechanism in the weapon 210 such that when the officer "cocks" the weapon 210 to begin to fire, the sensor 320 is connected to the external trigger mechanism 220 to trigger the transmitter 140 to transmit a signal when the weapon 210 is "cocked". This action indicates an event of interest, such as the Officer being about to fire his weapon.

The sensor 320 and sensor 330 can be used alone, together, and/or with the strap 222. The sensor 320 and sensor 330 create a redundancy in the system and a fall back should any of the other parts fail to activate for any reason.

Figure 7:
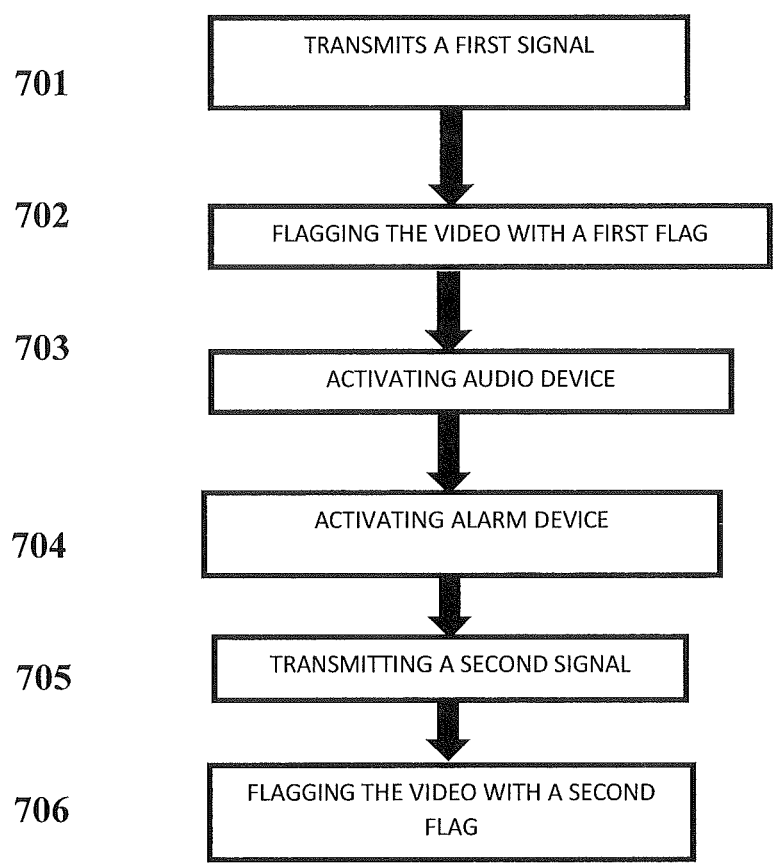
FIG. 7 exemplary shows a flow chart for safety a method 700.

FIG. 7 shows a high level flow chart for a body camera recording method 700.

Step 701 transmits a first signal based on the external trigger mechanism 220 being activated a first time.

Step 702 flags the video once the signal is received from step 701 with a starting flag 801.

Step 703 starts an audio recording on the camera 150.

Step 704 sends an alarm signal to a third party 170.

Step 705 transmits a second signal from the transmitter 140 when the external trigger mechanism 220 is activated a second time.

Step 706 flags the video with an ending flag 802 when a second signal is received from step 705.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further, Applicant's intent is to encompass the equivalents of all claim elements, and no amendment to any claim of the present application should be construed as a disclaimer of any interest in or right to an equivalent of any element or feature of the amended claim.

What is claimed is:

1. A safety system, comprising:
   a weapon holster including:
      a transmitter; and
      an external trigger mechanism configured to cause the transmitter to transmit a signal;
   a camera including:
      a receiver configured to receive the signal from the transmitter; and
      a body camera system including:
         a processor; and
         a memory, the memory storing instructions to cause the processor to execute when the receiver receives the signal:
            a flagging module configured to create a starting flag and an ending flag in a video segment recorded by the camera,
   wherein the weapon holster further includes a plurality of switches electrically connected to the external trigger mechanism,
   wherein when a first switch of the plurality of switches is pressed, the external trigger mechanism causes the transmitter to transmit the signal to the receiver and the flagging module embeds the starting flag in the video segment recorded by the camera, and
   wherein when a second switch of the plurality of switches is pressed, the external trigger mechanism causes the transmitter to transmit a second signal to the receiver, the second signal indicates a moderate event is occurring requiring a different type of the starting flag indicating the moderate event,
   wherein the flagging module embeds the starting flag and labels the starting flag as an extreme event when a weapon in the weapon holster is switched from a secured state to an un-secured state, the extreme event being an emergency event requiring an urgent response greater than the moderate event, and
   wherein the flagging module embeds the ending flag when the weapon in the weapon holster is switched from the un-secured state to the secured state,
   wherein the weapon includes a sensor disposed on a handle of the weapon that measures grip pressure,
   wherein the flagging module embeds a second starting flag when the grip pressure is detected by the sensor to be greater than a threshold grip pressure value while the weapon is still in the un-secured state,
   wherein the flagging module embeds a second ending flag when the grip pressure is detected by the sensor to lower to a value less than the threshold grip pressure value after exceeding the threshold grip pressure value while the weapon is still in the un-secured state,
   wherein the flagging module embeds the starting flag when the weapon holster is switched from a secured state to an un-secured state,
   wherein the flagging module embeds the ending flag when the weapon holster is switched from the un-secured state to the secured state,
   wherein the weapon holster further includes a strap for securing a weapon in the weapon holster having a hinge such that the strap rotates via the hinge from the secured state to the un-secured state, and
   wherein the hinge is connected to the external trigger mechanism such that:
      when the hinge rotates in a first direction from the secured state to the un-secured state, the external trigger mechanism causes the transmitter to transmit the signal; and
      when the hinge rotates in a second direction that traces back the movement in the first direction from the un-secured state to the secured state, the external trigger mechanism causes the transmitter to transmit a different signal.

2. The safety system of claim 1, wherein the external trigger mechanism is activated when a weapon in the weapon holster is switched from the secured state to the un-secured state.

3. The safety system of claim 1, wherein the external trigger mechanism is activated when a weapon in the weapon holster is switched from the secured state to the un-secured state, and
   wherein the external trigger mechanism is activated when the weapon in the weapon holster is switched from the un-secured state to the secured state.

4. The safety system of claim 1, wherein the flagging module embeds the starting flag when the signal is transmitted by the transmitter in the video segment, and
   wherein the flagging module embeds the ending flag when the different signal is transmitted by the transmitter in the video segment.

5. The safety system of claim 4, wherein the processor is further configured to execute:
   an audio module configured to record audio signals.

6. The safety system of claim 5, wherein the processor is further configured to execute:
   an alarm module configured to send a signal to a third party.

7. The safety system of claim 6, wherein the signal sent to the third party by the alarm module includes Global Positioning coordinates (GPS) of the weapon holster.

8. The safety system of claim 7, wherein the external trigger mechanism is activated when the weapon holster is in a state where a weapon is removable from the holster.

9. The safety system of claim 1, wherein the processor is further configured to execute:
   an audio module configured to record audio signals.

10. The safety system of claim 1, wherein the processor is further configured to execute:
    an alarm module configured to send a signal to a third party.

11. The safety system of claim 10, wherein the signal sent to the third party by the alarm module includes Global Positioning coordinates (GPS) of the weapon holster.

12. The safety system of claim 1, wherein the external trigger mechanism is activated when the weapon holster is in a state where a weapon is removable from the holster.

13. The safety system of claim 1, wherein the external trigger mechanism is activated when a weapon is removed from the weapon holster.

14. The safety system of claim 1, wherein the starting flag and the ending flag create a partition in the video segment.

15. A safety method for flagging a video segment recorded by a camera, comprising
    transmitting a first signal when an external mechanism of a weapon holster is activated;
    wherein a plurality of switches electrically connected to the external trigger mechanism, creating a starting flag of the video segment when the signal is received when a weapon in a weapon holster is switched from a secured state to an un-secured state and labels the starting flag as an extreme event, the extreme event being an emergency event requiring an urgent response greater than a moderate event;

wherein when a first switch of lit of switches is pressed, the external trigger mechanism causes the transmitting to transmit the signal to a receiver and embeds the starting flag in the video segment recorded by the camera, and wherein when a second switch of the plurality of switches is pressed, the external trigger mechanism causes the transmitting to transmit a second signal to the receiver, the second signal indicates the moderate event is occurring requiring a different type of the starting flag indicating the moderate event, transmitting a second signal when the external mechanism is activated a second time; and creating an end flag of the video segment when the second signal is received when the weapon in the weapon holster is switched from the un-secured state to the secured state, wherein the weapon includes a sensor disposed on a handle of the weapon that measures grip pressure, wherein the creating creates a second starting flag of the video segment when the grip pressure is detected by the sensor to be greater than a threshold grip pressure value while the weapon is still in the un-secured state, and wherein the creating creates a second ending flag of the video segment when the grip pressure is detected by the sensor to lower to a value less than the threshold grip pressure value after exceeding the threshold grip pressure value while the weapon is still in the un-secured state, wherein the creating further creates the starting flag when the weapon holster is switched from a secured state to an un-secured state, wherein the creating further creates the ending flag when the weapon holster is switched from the un-secured state to the secured state, wherein the wean holster further includes a strap for securing a weapon in the weapon holster having a hinge such that the strap rotates via the hinge from the secured state to the un-secured state, and wherein the hinge is connected to the external trigger mechanism such that:
  when the hinge rotates in a first direction from the secured state to the un-secured state, the external trigger mechanism causes the transmitting to transmit the signal; and
  when the hinge rotates in a second direction that traces back the movement in the direction from the un-secured state to the secured state, the external trigger mechanism causes the transmitting to transmit a different signal.

16. A non-transitory computer-readable recording medium recording a safety program for flagging a video segment recorded by a camera, the program causing a computer to perform:

transmitting a first signal when an external mechanism of weapon holster is activated;

wherein a plurality of switches electrically connected to the external trigger mechanism, creating a starting flag of the video segment when the signal is received when a weapon in a weapon holster is switched from a secured state to an un-secured state and labels the starting flag as an extreme event, the extreme event being an emergency event requiring an urgent response greater than a moderate event;

wherein when a first switch of the plurality of switches is pressed, the external trigger mechanism causes the transmitting to transmit the signal to a receiver and embeds the starting flag in the video segment recorded by the camera, and wherein when a second switch of the plurality of switches is pressed, the external trigger mechanism causes the transmitting to transmit a second signal to the receiver, the second signal indicates the moderate event is occurring requiring a different type of the starting flag indicating the moderate event, transmitting a second signal when the external mechanism is activated a second time; and creating an end flag of the video segment when the second signal is received when the weapon in the weapon holster is switched from the un-secured state to the secured state, wherein the weapon includes a sensor disposed on a handle of the weapon that measures grip pressure, wherein the creating creates a second starting flag of the video segment when the grip pressure is detected by the sensor to be greater than a threshold grip pressure value while the weapon is still in the un-secured state, and wherein the creating creates a second ending flag of the video segment when the grip pressure is detected by the sensor to lower to a value less than the threshold grip pressure value after exceeding the threshold grip pressure value while the weapon is still in the un-secured state, wherein the creatin further creates the starting flag when the weapon holster is switched from a secured state to an un-secured state, wherein the creating further creates the ending flag when the weapon holster is switched from the un-secured state to the secured state, wherein the weapon holster further includes a strap for securing a weapon in the weapon holster having a hinge such that the strap rotates via the hinge from the secured state to the un-secured state, and wherein the hinge is connected to the external trigger mechanism such that:
  when the hinge rotates in a first direction from the secured state to the un-secured state, the external trigger mechanism causes the transmitting to transmit the signal; and
  when the hinge rotates in a second direction that traces back the movement in the first direction from the un-secured state to the secured state, the external trigger mechanism causes the transmitting to transmit a different signal.

* * * * *